United States Patent
Tsiskaridze et al.

(10) Patent No.: US 12,462,480 B2
(45) Date of Patent: Nov. 4, 2025

(54) IMAGE PROCESSING METHOD

(71) Applicant: Vitaware Ltd, Exeter (GB)

(72) Inventors: Archil Tsiskaridze, Exeter (GB); Philippe Georges Young, Exeter (GB)

(73) Assignee: Vitaware Ltd, Exeter (GB)

( * ) Notice: Subject to any disclaimer, the term of this patent is extended or adjusted under 35 U.S.C. 154(b) by 162 days.

(21) Appl. No.: 18/564,209

(22) PCT Filed: May 24, 2022

(86) PCT No.: PCT/EP2022/064119
§ 371 (c)(1),
(2) Date: Nov. 27, 2023

(87) PCT Pub. No.: WO2022/248508
PCT Pub. Date: Dec. 1, 2022

(65) Prior Publication Data
US 2024/0249471 A1    Jul. 25, 2024

(30) Foreign Application Priority Data
May 26, 2021  (GB) .................................. 2107492

(51) Int. Cl.
*G06T 17/00* (2006.01)
*A61B 6/40* (2024.01)
(Continued)

(52) U.S. Cl.
CPC ............ *G06T 17/00* (2013.01); *A61B 6/4085* (2013.01); *A61B 6/51* (2024.01); *A61C 13/34* (2013.01);
(Continued)

(58) Field of Classification Search
CPC ................. G06T 17/00; G06T 2210/41; G06T 2207/20081; G06T 2207/20084;
(Continued)

(56) References Cited

U.S. PATENT DOCUMENTS

2019/0148005 A1   5/2019   Domracheva et al.
2019/0333199 A1   10/2019  Ozcan et al.
(Continued)

FOREIGN PATENT DOCUMENTS

EP    3503038 A1    6/2019
EP    3591616 A1    1/2020
(Continued)

OTHER PUBLICATIONS

International Search Report and Written Opinion for corresponding PCT Application No. PCT/EP2022/064119 dated Sep. 16, 2022 (14 pages).
(Continued)

*Primary Examiner* — Tammy Paige Goddard
(74) *Attorney, Agent, or Firm* — Leason Ellis LLP (57) ABSTRACT

The invention relates to the creation and/or use of an inference model that maps between a three-dimensional image data of an intra-oral tissue structure, e.g. shape and size of teeth roots, and a three-dimensional representation of an exposed surface of dental features of the intra-oral tissue structure, e.g. teeth crowns. In particular, the present invention proposes a method for image processing, using an inference model, a computer-readable surface representation of an individual's intra-oral tissue to provide a full three-dimensional representation of the intra-oral tissue. The present invention also proposes a method for creating the inference model.

20 Claims, 5 Drawing Sheets

(51) Int. Cl.
  *A61B 6/51* (2024.01)
  *A61C 13/34* (2006.01)
  *G06V 10/26* (2022.01)
  *G06V 10/764* (2022.01)
  *G06V 10/774* (2022.01)
  *G06V 10/82* (2022.01)

(52) U.S. Cl.
  CPC ............ *G06V 10/26* (2022.01); *G06V 10/764* (2022.01); *G06V 10/774* (2022.01); *G06V 10/82* (2022.01); *G06T 2210/41* (2013.01); *G06V 2201/03* (2022.01)

(58) Field of Classification Search
  CPC ........ G06T 2207/30036; A61B 6/4085; A61B 6/51; A61B 5/0088; A61C 13/34; A61C 7/002; G06V 10/26; G06V 10/764; G06V 10/774; G06V 10/82; G06V 2201/03
  See application file for complete search history.

(56) References Cited

U.S. PATENT DOCUMENTS

| | | |
|---|---|---|
| 2021/0059796 A1 | 3/2021 | Weiss et al. |
| 2021/0082184 A1 | 3/2021 | Claessen et al. |
| 2021/0110584 A1 | 4/2021 | Claessen et al. |

FOREIGN PATENT DOCUMENTS

| | | |
|---|---|---|
| EP | 3620130 A1 | 3/2020 |
| WO | 2019158442 A1 | 8/2019 |

OTHER PUBLICATIONS

GB Search Report for corresponding GB Application No. 2207608.7 dated Nov. 29, 2022 (6 pages).

IMAGE PROCESSING METHOD

CROSS-REFERENCE TO RELATED APPLICATIONS

This application is a U.S. National Stage Application under 35 U.S.C. § 371 of International Patent Application No. PCT/EP2022/064119, filed May 24, 2022, which claims priority to Great Britain Patent Application No. 2107492.7 filed May 26, 2021, the contents of which are each hereby incorporated by reference in their respective entireties.

FIELD OF THE INVENTION

The present invention relates to a method for generating a representation of a virtual three-dimensional object and particularly, although not exclusively, to a method for generating a virtual three-dimensional representation of intra-oral tissue.

BACKGROUND

Orthodontics is a specialty of dentistry, involving the correction of abnormal or badly positioned teeth and jaws. In order to plan orthodontic treatments, it is often necessary to obtain images or moulds of a patient's teeth and jaw.

Traditionally, dental impressions, which are negative imprints of teeth and gums, were used to provide a positive physical cast or model. These dental impressions can be made by placing a liquid or semi-solid impression material, such as an irreversible hydrocolloid, e.g. Alginate, into a mould tray, and placing the mould tray into the patient's mouth. When the patient bites down on the mould tray, the impression material sets to become an elastic solid, leaving a negative imprint of the patient's dentition (e.g. exposed crowns and gums in the oral cavity). This negative imprint can then be used to provide a positive cast of the patient's teeth and gums.

More recently, the use of intra-oral scans has gained popularity. Here, an intra-oral scanner casts light onto the teeth and gums. The teeth and gums are scanned by image sensors within the scanner to capture light that is reflected therefrom. The collected signals can be used to create a digital reconstruction of the surfaces of the teeth and mouth cavity.

However, physical dental impressions and intra-oral scans only provide information about the exposed surface of the teeth and gums. They do not provide any information, visualisation or quantification of internal volumetric structures of the teeth and surrounding oral cavity, including different layers in the crown (e.g. enamel, dentine, pulp cavity) nor the size, shape or structure of the roots.

Knowledge of the root structure in orthodontic treatment is not imperative in treatment planning, but it is very valuable for treatment design. In particular, knowledge of root structure can ensure effective loads applied on crowns through use of metal braces or clear aligners leads to appropriate loads (moments and forces) on the roots, which in turn directly affects both magnitude and direction of movement of teeth. Furthermore, knowledge of root structure can ensure that the path from initial dental positions to target dental positions does not lead to undesirable interactions between roots, nor to inappropriate positioning of the roots (e.g. too close to bony margins of the mandible or maxilla).

In order to obtain such three-dimensional internal information about hard tissue structure in order to improve treatment planning, it is known to use Cone Beam Computed Tomography (CBCT). CBCT is a radiographic imaging method that can be used to view roots and the internal structure of the teeth.

However, CBCT typically has a lower resolution than surface representations provided by physical dental impressions or intra-oral scans. Furthermore, it is often not prescribed for patients, due to the health and safety considerations of being exposed to X-rays, and/or due to cost.

In these situations, where it is undesirable to use CBCT, heuristics can be used, which rely in great part on the expertise of the individual orthodontist carrying out, or overseeing, the treatment protocol.

The present invention has been devised in light of the above considerations.

SUMMARY OF THE INVENTION

At its most general, the invention relates to the creation and/or use of an inference model that maps between a three-dimensional image data of an intra-oral tissue structure, e.g. shape and size of dental tissue include crowns, roots, bone, etc., and a three-dimensional representation of an exposed surface of dental features of the intra-oral tissue structure, i.e. an exposed surface of crowns and gums. In particular, the present invention proposes a method for image processing, using an inference model, a computer-readable surface representation of an individual's intra-oral tissue to provide a full three-dimensional representation of the intra-oral tissue. The present invention also proposes a method for creating the inference model.

According to a first aspect, there is provided a method for training a machine learning inference model, wherein the trained machine learning inference model is for use in generating a representation of a virtual three-dimensional cast of an internal structure of an individual's intra-oral tissue from a computer-readable surface representation of exposed portions of the individual's intra-oral tissue, the method comprising: obtaining first three-dimensional image data representing internal tissue characteristics within an intra-oral cavity for a plurality of individuals; obtaining second three-dimensional image data representing a shape of a volume enclosed by external surface of intra-oral tissue for the plurality of individuals, wherein the first three-dimensional image data and second three-dimensional image data for each of the plurality of individuals form a co-registered pair; and training the machine learning inference model using the co-registered pairs of first three-dimensional image data and second three-dimensional image data for the plurality of individuals. The co-registered pairs of first three-dimensional image data and second three-dimensional image data may thus form training data for the inference model. In particular, the first three-dimensional image data may be a target of the training, so that the inference model operates to infer an internal structure of intra-oral tissue from an undifferentiated surface representation thereof.

As used herein, the internal tissue characteristics within an intra-oral cavity may refer to non-visible (e.g. unexposed, beneath the gum line and/or within the tooth) structure of the intra-oral tissue, for roots, PDL, bone, bone-like structures and/or the internal structure of the layers in the crown, such as the pulp cavity, dentine and enamel. Exposed portions of the intra-oral tissue may refer to visible portions of the intra-oral tissue, i.e. gum tissue and dental tissue that is visible above the gum line.

The first three-dimensional image data used to train the inference model may be obtained directly from the plurality of individuals, e.g. by three-dimensional volumetric imaging scans. For example, the three-dimensional internal intra-oral tissue image data may comprise Cone Beam Computer Tomography (CBCT) scan data, or any other full three-dimensional volume imaging scan data, such as MRI or serial sectioning scan data. The method may comprise the step of obtaining the first three-dimensional image data tissue data directly, such as CBCT scan data, directly from the plurality of individuals, e.g. by a CBCT procedure, for example.

The step of obtaining the second three-dimensional image data may therefore comprise: obtaining a computer-readable surface representation of exposed portions of the individual's intra-oral tissue; sampling the surface representation to obtain a digitised three-dimensional image thereof; and registering the digitised three-dimensional image with the first three-dimensional image data (obtained for the same individual). In this example, the training data may thus comprise information obtained from actual surface representations of exposed portions of intra-oral tissue corresponding to the first three-dimensional image data for at least some, and optionally each, of the plurality of individuals.

To facilitate the registering step, the digitised three-dimensional image of the surface representation may be established in a frame of reference (e.g. Cartesian coordinate system) having the same dimensions as that used for the first three-dimensional image data. If necessary, the surface representation may be cropped or resized to achieve this purpose. The digitised three-dimensional image can therefore be directly overlaid on the first three-dimensional image data. The surface representation may be sampled at the same resolution as the first three-dimensional image data, so that the first and second three-dimensional image data have a common voxel density.

The computer-readable surface representations that may be used for training the machine learning inference model may be obtained from a physical moulding impression or digitally acquired impression of exposed intra-oral tissue, for example by intra-oral scan, for the at least some of the plurality of individuals. In a physical moulding impression, a tray mould may be filled with irreversible hydrocolloid, such as Alginate, and placed in an individual's mouth, where the physical impression may be obtained when the individual bites down into the tray mould.

In an alternative approach, the second three-dimensional image data may be derived from the first three-dimensional image data, for example by "defeaturing" the first three-dimensional image data and presenting it as a binary voxelized representation of the intra-oral tissue. In other words, the voxels of the second three-dimensional image data indicate only the presence or absence of tissue in contrast to the more nuanced grayscale data of the first three-dimensional image data. This approach can work because the external surface boundaries that are visible in the digitised version of the surface impression data discussed above are very similar to boundaries which can be straightforwardly identified in the first three-dimensional image data. In other words, defeaturing the first three-dimensional image data actually provides a similar result to digitising a surface impression. Either result can be used to train against the full first three-dimensional image data, which may be greyscale with or without partitioning/segmentation as discussed below.

An advantage of this alternative approach is that a training set for the inference model may be obtained from a single data source. That is, the only data to be input in order to train the machine learning inference model is the first three-dimensional image data for the plurality of individuals. As the corresponding second three-dimensional image data (of the external surface shape) can be extracted from the first three-dimensional image data itself, there is no need to also provide separate surface representations in the training data. In this way, the method generates its own truth data (i.e. the co-registered pairs of first three-dimensional image data and second three-dimensional image data, for each of the plurality of individuals) for use in training the machine learning inference model. This alternative approach also obviates the need to digitise and co-register the surface impression with the first three-dimensional image data.

In some examples, the method may include enhancing the second three-dimensional image data derived from the first three-dimensional image data. For example, if the first three-dimensional image data is CBCT data, the location of gum tissue may not be discernible. The defeatured image data may therefore be enhanced by adding voxels corresponding to a likely location of gum tissue so that the second three-dimensional image data derived from the first three-dimensional image data resembles the second three-dimensional image data that would be obtained from a corresponding surface impression.

In use, an input to the trained machine learning inference model may be the computer-readable surface representation of the individual's intra-oral tissue, and the output may be a representation of the virtual three-dimensional cast of the internal structure of the intra-oral tissue, e.g. as 3D grayscale image data that mimics a CBCT scan output.

The trained machine learning model may be a trained artificial neural network, for example.

The step of training the machine learning inference model may comprise providing a learning algorithm with the co-registered pairs of first three-dimensional image data and second three-dimensional image data. The machine learning inference model may be iteratively trained using a Convolutional Neural Network, or any other conventional machine learning technique, for example.

In some examples, the training data for a given individual may include: (i) the first three-dimensional image data, (ii) second three-dimensional image data derived from the first three-dimensional image data, and (iii) second three-dimensional image data obtained from the computer-readable surface representation obtained by direct intra-oral measurement.

This may further train the machine learning inference model, by iteratively optimizing the machine learning inference model using the second three-dimensional image data obtained from known computer-readable surface representation and their corresponding first three-dimensional image data (e.g. truth data obtained directly from the individual). Training errors may therefore be reduced, and the accuracy of the machine learning inference model can be improved.

The trained machine learning inference model may be used to generate a representation of a virtual three-dimensional cast of an internal structure of an individual's intra-oral tissue, from a computer-readable surface representation of exposed portions of the individual's intra-oral tissue. As such, an approximation of the internal structure of the intra-oral tissue (e.g. teeth roots) in the individual's mouth can be obtained without the negative health and safety implications and costs of a full volumetric three-dimensional scan, such as CBCT. Instead, only a computer-readable surface impression of the exposed parts of the individual's intra-oral tissue (e.g. the teeth crowns) is required in order to obtain a full volumetric three-dimensional image of the internal structure of the intra-oral tissue (e.g. the shape and size of the teeth roots). This may help to improve planning for many orthodontic treatments, without the need for full three-dimensional volumetric scans. For example, as the teeth roots can be mapped, the effective loads applied to the roots, and therefore the effective loads required to be applied to the teeth crowns through the use of braces or aligners, can be calculated. Furthermore, knowledge of the root structure and size may help to ensure that the path from initial dental positions to target positions do not lead to undesirable interactions between the roots, nor inappropriate positioning of the roots.

The intra-oral tissue may comprise hard tissue and soft tissue. Hard tissue may include teeth, periodontal ligament (PDL), bone (e.g. aleovar bone, mandible, maxilla), or other bone-like structures in an individual's mouth. Soft tissue may include gums.

Accordingly, the computer readable surface representation of the individual's intra-oral tissue may be a computer readable surface representation of the individual's exposed teeth and gums, for example.

After the step of training the machine learning inference model, the method may further comprise the step of testing the trained machine learning inference model. In particular, the trained machine learning model may be tested using test data, wherein the test data has not been used to train the machine learning inference model.

For example, this step may comprise inputting second three-dimensional image data for an individual not included in the training set to the trained machine learning model; and evaluating the accuracy of a virtual three-dimensional cast output from the trained machine learning inference model by comparing the virtual three-dimensional cast to the first three-dimensional image data that corresponds to the input second three-dimensional image data.

The step of training the machine learning inference model may include using only a first portion of the co-registered pairs of first three-dimensional image data and second three-dimensional image data as the training data to train the machine learning inference model. A second portion (e.g. the remainder) of the co-registered pairs of first three-dimensional image data and second three-dimensional image data may be used as the test data. The ratio between the first portion and the second portion may be 70:30, 80:20, or 90:10, for example.

In the training set, the first three-dimensional image data may be labelled with tissue type data. For example, the first three-dimensional image data may be partitioned or segmented into labelled sub-volumes or portions. In particular, the method may further comprise partitioning the first three-dimensional image data into parts according to the type of intra-oral tissue, and labelling the position of the parts. The partitioning may be performed manually, optionally with assistance from a statistics-based model. For example, this step may be performed using convolutional neural networks (CNNs), such as a multiclass model, or by any other conventional approach.

In this way, the machine learning inference model may be trained to label different tissue types in a generated representation of a virtual three-dimensional cast of an internal structure of an individual's intra-oral tissue, from a computer-readable surface representation of exposed portions of the individual's intra-oral tissue. Based on the labelling provided by the inference model, it is then possible to infer boundaries between labelled sub-volumes that are in contact.

The first three-dimensional image data may comprise information about hard tissue, whereas the second three-dimensional image data may represent an undifferentiated volume of both soft and hard tissue. An advantage of the inference model trained using the technique outlined above is that any influence of the shape of soft tissue (e.g. gum) on the internal hard tissue structure can be captured. Moreover, where the first three-dimensional image data for a given co-registered pair is labelled, it may be possible to establish a boundary between gum tissue and dental tissue in the second three-dimensional image data in the same co-registered pair. This boundary information may be used in the process of inferring other (e.g. internal) boundaries between labelled sub-volumes in an inferred internal structure.

According to a second aspect, there is provided a computer program product comprising a computer-readable storage medium having software instructions stored thereon, the software instructions being executable by a computer to perform the method of the first aspect.

According to a third aspect, there is provided a machine learning inference model trained in accordance with the method of the first aspect.

According to a fourth aspect, there is provided a method for generating a representation of a virtual three-dimensional cast of an internal structure of an individual's intra-oral tissue, from a computer-readable surface representation of exposed portions of the individual's intra-oral tissue, using a machine learning inference model trained in accordance with the method of the first aspect.

According to the fourth aspect, the internal structure of the intra-oral tissue in the individual's mouth can be determined without the negative health and safety implications and costs of a full volumetric three-dimensional scan, such as CBCT. In particular, this is achieved using a trained machine learning inference model.

According to a fifth aspect, there is provided a method for generating a representation of a virtual three-dimensional cast of an internal structure of an individual's intra-oral tissue, the method comprising: obtaining a computer-readable surface representation of exposed portions of the individual's intra-oral tissue; converting the surface representation into a digitised three-dimensional image data; applying an inference model to the digitised three-dimensional image data, the inference model associating, for each of a plurality of individuals, (i) first three-dimensional image data representing tissue characteristics within an intra-oral cavity with (ii) second three-dimensional image data representing a shape of a volume enclosed by external surface of intra-oral tissue; and generating a representation of a virtual three-dimensional cast of an internal structure of the individual's intra-oral tissue from the digitised three-dimensional image data, using the inference model.

As mentioned above, the inference model may be the machine learning inference model trained in accordance with the method of the first aspect.

The step of generating the representation of a virtual three-dimensional cast of an internal structure of an individual's intra-oral tissue may therefore be based on the expected representation of a virtual three-dimensional cast of an internal structure of the individual's intra-oral tissue.

The computer-readable surface representation of exposed portions of the individual's intra-oral tissue may comprise a point cloud or a surface tessellation comprising a mesh of contiguous polygons (e.g. triangles). Alternatively, it may be defined using a Non-uniform rational basis spline (NURBS).

The computer-readable surface representation of exposed portions of the individual's intra-oral tissue may be obtained from a physical moulding impression or digitally acquired impression of the exposed hard tissue in the individual's mouth, for example by intra-oral scan. In a physical moulding impression, a tray mould may be filled with irreversible hydrocolloid, such as Alginate, placed in the individual's mouth, where the physical impression may be obtained when the individual bites down into the tray mould.

The method may further comprise labelling different tissue types in the generated representation of the virtual three-dimensional cast of an internal structure of an individual's intra-oral tissue, using the inference model, based on the computer-readable surface representation of exposed portions of the individual's intra-oral tissue. The generated virtual three-dimensional representation may thus comprise a segmented three-dimensional model, in which each segment of the model has different tissue characteristics. The segmented three-dimensional model may comprise separate segments for any one or more of dental tissue (e.g. crown/root), bone tissue (e.g. maxilla, mandible), and gum tissue.

Generating the virtual three-dimensional representation may further comprise inferring interstitial boundaries between segments of the three-dimensional model that are in contact.

The surface representation may be converted into a digitised three-dimensional image data by sampling the surface representation at a resolution corresponding to that used in training data for the inference model. The data input to the inference model is thus of the same type (image space) and resolution as the training data. In other words, the digitised three-dimensional image data that is input to the inference model occupies or overlays the same frame of reference used for the training data.

The method may comprise calculating a position of effective centre of resistance of the individual's intra-oral tissue using the representation of the virtual three-dimensional cast generated using the inference model.

The representation of the virtual three-dimensional cast generated using the inference model may be a full three dimensional numerical representation. For example, a finite element model may be generated. The full three dimensional representation may be of both the hard tissue and the soft tissue in the individual's mouth.

The method may include outputting the representation of the virtual three-dimensional cast generated using the inference model, e.g. for display or further processing. For example, the virtual three-dimensional cast may be transmitted to a three-dimensional printer or CNC machine.

The output virtual three-dimensional cast may be used to construct a surface representation of the intra-oral tissue. The surface representation may be constructed using the marching cube algorithm, or any other known surface reconstruction technique.

The step of constructing a surface representation of the intra-oral tissue may comprise constructing a surface representation of internal and/or exposed portions of the hard tissue. For example, not only may the exposed (e.g. visible, and above the gum line) surfaces of the teeth be constructed in the representation, internal (e.g. non-visible, below the gum-line or internal to the crown of the teeth) surfaces of the teeth may also be constructed in the representation, for example surfaces of the roots. In one example, the exposed portions of the constructed surface representation may be snapped back to corresponding positions on the input surface representation, e.g. to recover detail from the input surface representation that may been lost in the conversion to the digitised three-dimensional image data Each of the constructed surface representations may comprise a point cloud or a surface tessellation comprising a mesh of contiguous polygons (e.g. triangles). Alternatively, the constructed surface representations may be defined using a Non-uniform rational basis spline (NURBS).

According to a sixth aspect, there is provided a computer program product comprising a computer-readable storage medium having software instructions stored thereon, the software instructions being executable by a computer to perform the method the fourth aspect.

The invention includes the combination of the aspects and preferred features described except where such a combination is clearly impermissible or expressly avoided.

SUMMARY OF THE FIGURES

Embodiments and experiments illustrating the principles of the invention will now be discussed with reference to the accompanying figures in which.

DETAILED DESCRIPTION OF THE INVENTION

Aspects and embodiments of the present invention will now be discussed with reference to the accompanying figures. Further aspects and embodiments will be apparent to those skilled in the art. All documents mentioned in this text are incorporated herein by reference.

Figure 1:
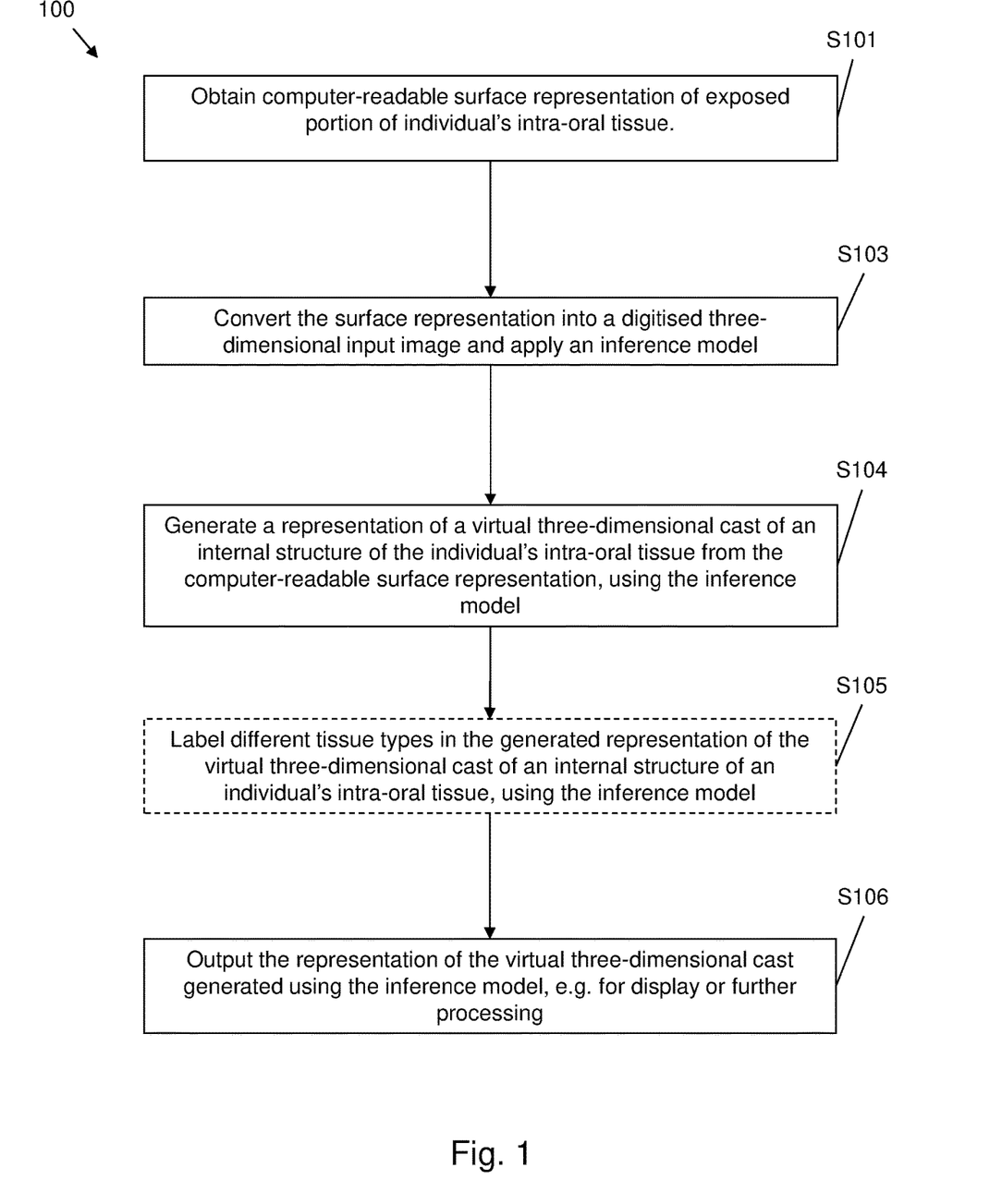
FIG. 1 is a flow diagram showing a method for generating a representation of a virtual three-dimensional cast of an internal structure of an individual's intra-oral tissue.

FIG. 1 is a flow diagram illustrating a method 100 for generating a representation of a virtual three-dimensional cast of an internal structure of an individual's intra-oral tissue. In particular, method 100 uses an inference model to predict the internal structure of the intra-oral tissue (e.g. teeth roots) from surface impression information without the negative health and safety implications and costs of a full volumetric 3D scan, such as CBCT. The intra-oral tissue may include teeth, PDL, bone, and gums, for example.

At S101, a computer-readable surface representation of exposed portions of the individual's intra-oral tissue is obtained. The computer-readable surface representation may be obtained from a physical moulding impression or digitally acquired impression of the exposed hard tissue in the individual's mouth, for example by intra-oral scan. In a physical moulding impression, a tray mould may be filled with irreversible hydrocolloid, such as Alginate, placed in the individual's mouth, where the physical impression may be obtained when the individual bites down into the tray mould.

The resulting computer-readable surface representation comprises a point cloud, a volume mesh, or a surface tessellation comprising a mesh of contiguous polygons (e.g. triangles). Alternatively, it may be defined using a non-uniform rational basis spline (NURBS).

In S103, the computer-readable surface representation is converted into a digitised three-dimensional input image, e.g. by sampling the computer-readable surface representation to obtain a 3D voxelized model of the volume bounded by the surface representation. The sampling rate is preferably identical to that used in the training data for the inference model (discussed below) so that the digitised three-dimensional input image occupies (overlays) the same frame of reference and dimensions as used for the training data. The inference model is then applied to the digitised three-dimensional input image. The inference model is configured to map the digitised three-dimensional input image to a 3D internal intra-oral tissue image data, that is to infer information about the internal structure of the volume bounded by the surface representation from its external surface shape. The inference model is established by associating, for each of a plurality of individuals, known (i.e. measured) 3D internal intra-oral tissue image data with surface representations of the intra-oral tissue, as discussed below.

In some examples, the inference model may be a machine learning inference model. In these examples, the machine learning inference model is trained to use a training data set that comprises, for each of a plurality of individuals, (i) a first 3D image of the internal structure of each individual's intra-oral tissue and (ii) a corresponding (co-registered) second 3D image that represents a volume bounded by the external (i.e. visible) surface of the individual's intra-oral tissue.

The first 3D image provides information about the internal (not-visible) structure, and can be obtained using a CBCT scan, for example.

The second 3D image is simply a 3D representation of the outer "shell" of exposed tissue, and can be obtained in a variety of ways. In one example, the second 3D image is obtained directly from the first 3D image, by "defeaturing" the internal structure so that the image becomes a binary voxelized representation, with each voxel value indicating if it is in or out of the volume bounded by the external (i.e. visible) surface of the individual's intra-oral tissue. In another example, the second 3D image can be obtained from a surface representation of the intra-oral tissue (e.g. obtained by an intra-oral scan of the same individual from whom the first 3D image is obtained) by closing and sampling the surface representation to form digital 3D representation. The sampling rate may correspond to the resolution of the first 3D image so that the second 3D image can be co-registered with the first 3D image to provide the training set. The former technique may be preferred because it avoids the need to obtain both CBCT data and separate matching impression data as well as obviating the need to co-register the first and second 3D images because they already share a common frame of reference.

In a further development of the ideas disclosed above, features from the independently obtained surface representation may be used to enhance the first 3D image data in the training set as now explained. Typically, CBCT data does not include information about soft tissue, such as the gums. However, the location of the exterior surface of gum tissue can be obtained from a corresponding surface representation (or can be estimated based on bone location). In one example, the surface representation may be partitioned to identify different tissue types and then digitised as discussed above. Voxels in the digitised image that are labelled as gum tissue may then be added (e.g. as a Boolean operation) to the first 3D image data. In this way the first 3D image data is enhanced to include gum tissue, which in turn enables the output of the inference model to be training to produced predicted intra-oral tissue structures that include the location of gums. The second 3D image data for the training set may be derived from first 3D image data that is enhanced in this way.

As mentioned above, the inference model may also be trained to infer tissue types for the predicted 3D internal intra-oral tissue image data. In this case, the training data (i.e. at least the first 3D image) for each individual is partitioned and labelled to identify different tissue types. The training data set may thus also include tissue types labelling for each individual.

As discussed above with reference to S103, an input to the machine learning inference model may be a digitised three-dimensional image (similar to the second 3D image of the training set) obtained from a computer-readable surface representation of an individual's intra-oral tissue. The output may be a representation of the virtual three-dimensional cast of the internal structure of the intra-oral tissue (e.g. similar to the first 3D image of the training set).

In S104, a virtual 3D cast of an internal structure of the individual's intra-oral tissue is generated from the computer-readable surface representation, using the inference model (e.g. the output of the inference model, or the result of applying the inference model in S103).

Where the training data set included tissue type labelling, the output virtual three-dimensional cast may automatically be partitioned and labelled. At S105, the generated representation of the virtual 3D cast of the internal structure of an individual's intra-oral tissue may be partitioned and labelled into different tissue types, using the inference model. Accordingly, the resulting generated representation of the virtual 3D cast of the individual's intra-oral tissue is also labelled according to tissue type.

Although not shown in FIG. 1, optionally, method 100 may comprise calculating a position of effective centre of resistance of the individual's intra-oral tissue using the representation of the virtual 3D cast generated using the inference model.

Finally, in S106, the representation of the virtual 3D cast generated using the model is output for display or further processing (e.g. to a 3D printer or CNC machine). In one example, the output is voxelized image data, e.g. have a format or appearance similar to the first 3D image data (e.g. a CBCT scan output). However, in other examples, the virtual 3D cast may be used to add further detail to the input surface representation. For example, the virtual 3D cast may be used to construct a surface representation of the intra-oral tissue showing both external (visible) and internal boundaries between different tissue types. The surface representation construction may be performed using the marching cube algorithm, or any other known surface reconstruction technique. In the surface representation constructed in this way, not only are the exposed (e.g. visible, and above the gum line) surfaces of the teeth obtained in the representation, but internal (e.g. non-visible, below the gum-line or internal to the crown of the teeth) surfaces of the teeth are predicted in line with the inference model, for example to show the shape of the surfaces of the roots.

Each of the constructed surface representations may comprise a point cloud, or a surface tessellation comprising a mesh of contiguous polygons (e.g. triangles). Alternatively, the constructed surface representations may be defined using a Non-uniform rational basis spline (NURBS).

If the reconstructed surface representation has a lower resolution than the input surface representation, it may be possible to recover some of the detail of the input surface representation by snapping points on the (unchanged) exterior surface back on the corresponding points of the input surface representation. In this scenario only the newly added boundaries would have a resolution limited by that of the underlying virtual 3D cast.

Figure 2:
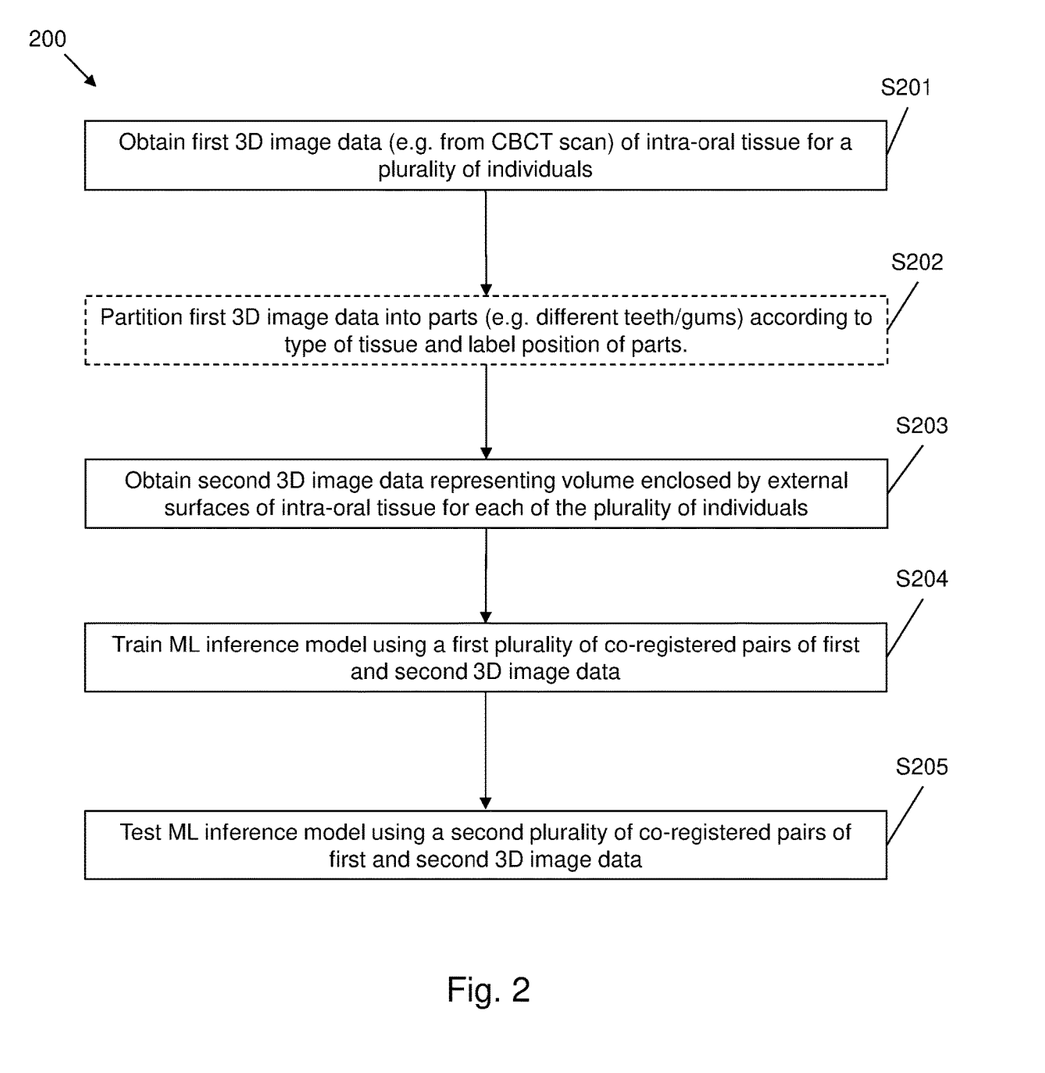
FIG. 2 is a flow diagram showing a method for training a machine learning inference model which may be for use in the method shown in FIG. 1.

As mentioned above, the inference model used to generate a virtual 3D cast in method 100 may in some examples be a trained machine learning (ML) inference model. FIG. 2 is a method 200 for training such a machine learning model.

At S201 of method 200 for training the ML inference model, first 3D image data of intra-oral tissue is obtained for each of a plurality of individuals. The first 3D image data may be collected directly from the plurality of individuals by 3D volumetric scanning, such as in a CBCT procedure.

Optionally, at S202, the first 3D image data may be partitioned into parts according to the type of intra-oral tissue (e.g. different teeth, gums, root), and labelled. S202 may be performed manually. Alternatively, S202 may be performed using convolutional neural networks (CNNs), such as a multiclass model, or by any other conventional approach.

At S203, second 3D image data of intra-oral tissue is obtained for each of the plurality of individuals. The second 3D image data is a voxelized representation of a volume enclosed by an external (i.e. visible) surface of the intra-oral tissue. As discussed above, the second 3D image data may be obtained by "defeaturing" the first 3D image data. With this technique, the second 3D image data is by default co-registered with (and has the same resolution) as the first 3D image data. In another example, however, the second 3D image data may be obtained by digitising (e.g. sampling at the same resolution as the first 3D image) a separately obtained surface representation of the (visible) intra-oral tissue surfaces. The digitised image may then be co-registered with the first image data in a conventional manner.

The result of step S203 is, for each of the plurality of individuals, a corresponding pair including (i) the first 3D image data; and (ii) the second 3D image data.

If the first 3D image data was partitioned at S202 and the second 3D image data is obtaining by defeaturing the first 3D image data, the voxels at the surface of the volume in the second 3D image may retain labelling corresponding to the partitioning into tissue types. In other examples, however, the second 3D image may be unlabelled.

At S204, the ML inference model is trained using a first plurality of corresponding (i.e. co-registered) pairs of first and second 3D image data. The first plurality may comprise only a subset of the generated pairs of first and second 3D image data. The remainder are kept for testing the ML inference model in S205.

In S204, the first plurality of corresponding pairs of first and second 3D image data are provided to a learning algorithm, and the ML inference model is iteratively trained using a Convolutional Neural Network, or any other conventional machine learning technique.

When the first 3D image data is partitioned in S202, the ML inference model is trained to apply tissue labelling.

After, the ML inference model is trained in S204, the ML inference model is then tested at S205. The ML inference model is tested using a second plurality of (i.e. the remaining) corresponding pairs of first and second 3D image data. The data used for testing is not used to train the ML inference model. The ratio between the first plurality and the second plurality may be 70:30, 80:20, or 90:10, for example.

Step S205 comprises inputting an unseen second 3D image data to the trained ML inference model, wherein the unseen second 3D image data has not been used to train the ML inference model, and evaluating the accuracy of the output from the trained ML inference model compared to the first 3D image data that corresponds to the unseen second 3D image data (i.e. the truth data).

Once the trained ML inference model has been tested, it can be used in method 100 of FIG. 1.

Figure 3:
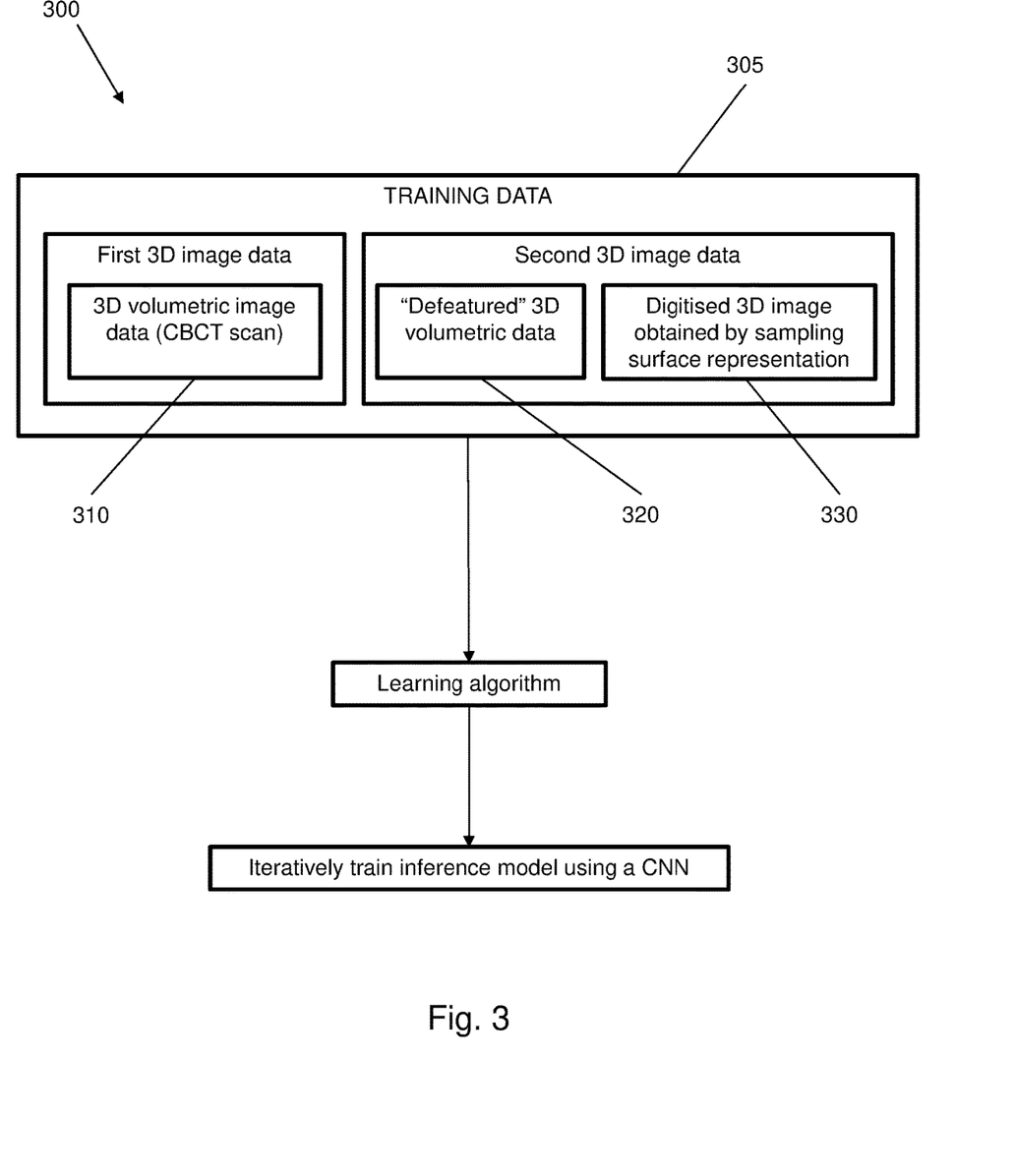
FIG. 3 illustrates steps in an example method for training machine learning inference model.

FIG. 3 illustrates a method 300 for training a ML inference model in which the training data 305 comprises co-registered data triplets. Each data triplet comprises the first 3D image data 310 discussed above together with both type of second 3D image data, i.e. both (i) a "defeatured" version 320 of the first 3D image data, and (ii) a digitised image 330 obtained from a separately obtained surface representation of the (visible) intra-oral tissue surfaces. This extended training set may further train the machine learning inference model, by iteratively optimizing the machine learning inference model using the known additional computer-readable surface representations 330 and corresponding three-dimensional scan representations 310 (e.g. truth data obtained directly from the individual). Training errors may therefore be reduced, and the accuracy of the machine learning inference model can be improved.

Figure 4A:
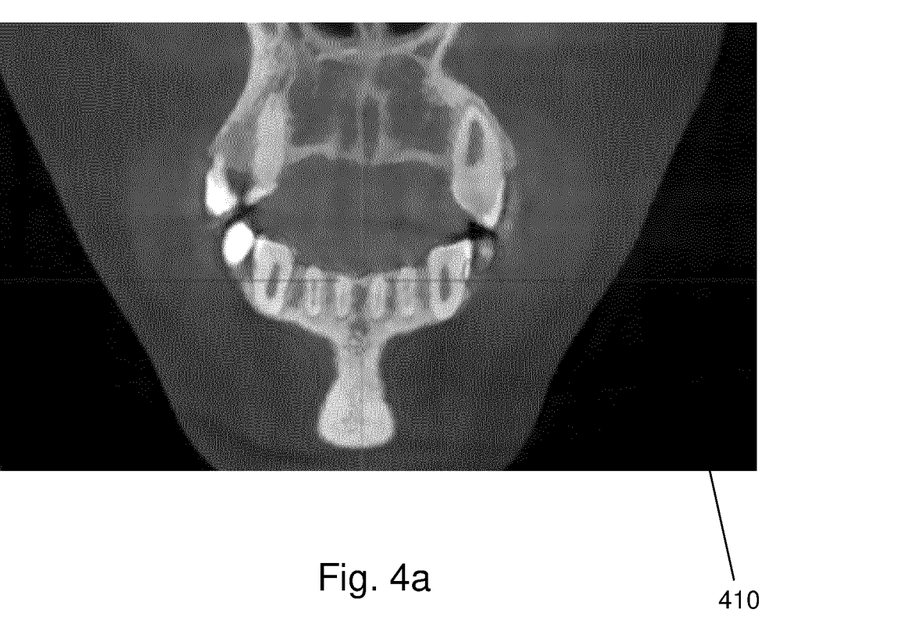
FIG. 4*a*-4*c* illustrate i) 3D internal intra-oral tissue image data, (ii) constructed surface representations, and (iii) additional computer-readable surface representations, respectively, which are used in the method shown in FIG. 3.
Figure 4B:
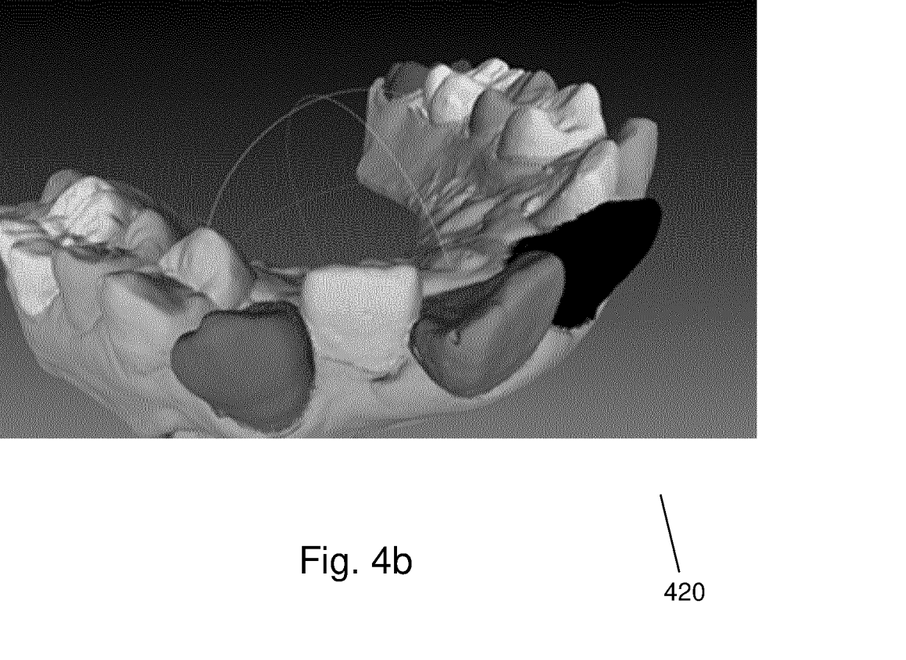
Figure 4C:
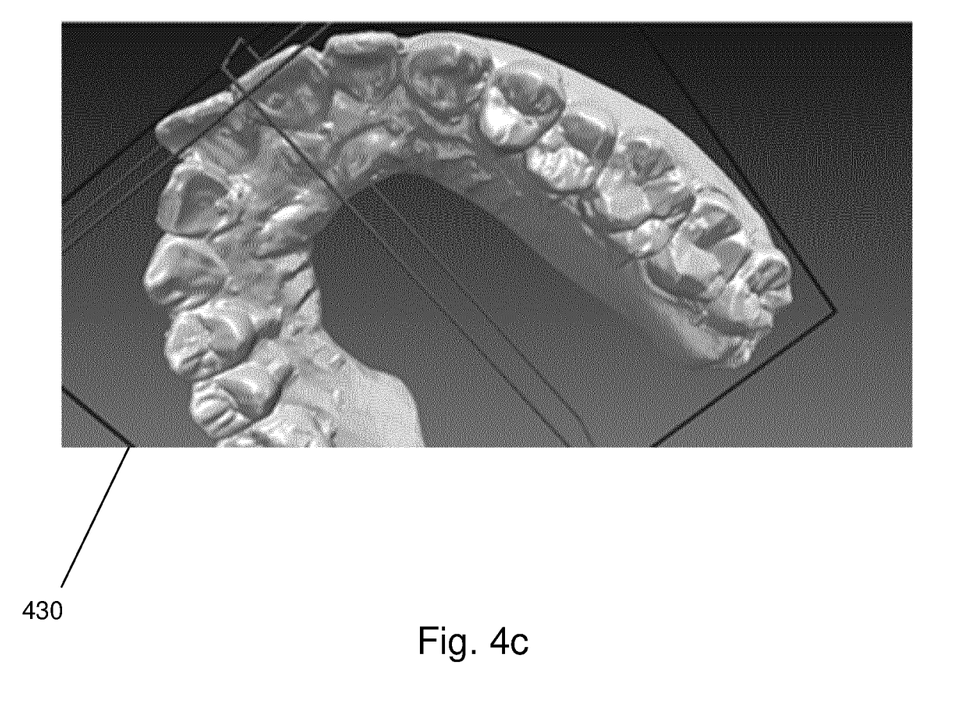

FIG. 4a-4c illustrate example truth data 305 used in the method for training the machine learning inference model, and specifically i) an example 2D section view through 3D internal intra-oral tissue image data 410 obtained directly from the at least some of the plurality of individuals, (ii) constructed, partitioned and labelled surface representations 420 constructed from the 3D internal intra-oral tissue image data, and (iii) additional computer-readable surface representations 430 obtained directly from the at least some of the plurality of individuals, respectively.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the word "comprise" and "include", and variations such as "comprises", "comprising", and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means for example +/−10%.

The invention claimed is:

1. A method for training a machine learning inference model, wherein the trained machine learning inference model is for use in generating a representation of a virtual three-dimensional cast of an internal structure of an individual's intra-oral tissue from a computer-readable surface representation of exposed portions of the individual's intra-oral tissue, the method comprising:
obtaining first three-dimensional image data representing tissue characteristics within an intra-oral cavity for a plurality of individuals;
obtaining second three-dimensional image data representing a shape of a volume enclosed by an external surface of intra-oral tissue that is exposed within the intra-oral cavity for the plurality of individuals, wherein the second three-dimensional image data is of exposed intra-oral tissue that comprises both hard tissue and soft tissue, and wherein the first three-dimensional image data and second three-dimensional image data for each of the plurality of individuals form a co-registered pair; and
training the machine learning inference model using a training set obtained from the co-registered pairs of first three-dimensional image data and second three-dimensional image data for the plurality of individuals, wherein the first three-dimensional image data is used as a target for the training.

2. The method of claim 1, wherein the first three-dimensional image data is obtained directly from the plurality of individuals by three-dimensional volumetric imaging scans.

3. The method of claim 1, wherein the first three-dimensional image data comprises Cone Beam Computer Tomography, CBCT, scan data.

4. The method of claim 1, wherein obtaining the second three-dimensional image data includes deriving the second three-dimensional image data from the first three-dimensional image data.

5. The method of claim 4, wherein deriving the second three-dimensional image data from the first three-dimensional image data comprises converting the first three-dimensional image data into a binary voxelized representation of the intra-oral tissue.

6. The method of claim 1, wherein obtaining the second three-dimensional image data comprises:
obtaining a surface representation that represents the external surface of intra-oral tissue exposed within the intra-oral cavity;
sampling the surface representation to obtain a digitised three-dimensional image thereof; and
registering the digitised three-dimensional image with the first three-dimensional image data.

7. The method of claim 6, wherein the surface representation is sampled at the same resolution as the first three-dimensional image data.

8. The method of claim 6, wherein the surface representation is obtained from a physical moulding impression or digitally acquired impression of exposed intra-oral tissue.

9. The method of claim 1, wherein the step of training the machine learning inference model comprises providing a learning algorithm with the co-registered pairs of first three-dimensional image data and second three-dimensional image data for the plurality of individuals.

10. The method of claim 1, wherein the step of training the machine learning inference model comprises iteratively training the machine learning inference model using a Convolutional Neural Network.

11. The method of claim 1, further comprising:
labelling the first three-dimensional image data for the plurality of individuals according to the type of intra-oral tissue.

12. The method of claim 1, further comprising the steps of:
partitioning the first three-dimensional image data into parts according to the type of intra-oral tissue and labelling the position of the parts; and
training the machine learning inference model using the partitioned first three-dimensional image data as the target.

13. A computer program product comprising a computer-readable storage medium having software instructions stored thereon, the software instructions being executable by a computer to perform the method of claim 1.

14. A machine learning inference model trained in accordance with the method of any of claim 1.

15. A method for generating a representation of a virtual three-dimensional cast of an internal structure of an individual's intra-oral tissue, the method comprising:
obtaining a computer-readable surface representation of portions of the individual's intra-oral tissue that are exposed within the individual's intra-oral cavity, the surface representation being of exposed intra-oral tissue that comprises both hard tissue and soft tissue;
converting the surface representation into a digitised three-dimensional image data;
applying an inference model to the digitised three-dimensional image data, the inference model associating, for each of a plurality of individuals, (i) first three-dimensional image data representing tissue characteristics within an intra-oral cavity with (ii) second three-dimensional image data representing a shape of a volume enclosed by external surfaces of intra-oral tissue that comprises both hard tissue and soft tissue; and
generating a virtual three-dimensional representation of an internal structure of the individual's intra-oral tissue from the digitised three-dimensional image data, using the inference model.

16. The method of claim 15, wherein the generated virtual three-dimensional representation is a segmented three-dimensional model, in which each segment of the model has different tissue characteristics.

17. The method of claim 16, wherein the segmented three-dimensional model comprises separate segments for any one or more of dental tissue, bone tissue, and gum tissue.

18. The method of claim 16, wherein generating the virtual three-dimensional representation comprising inferring interstitial boundaries between segments of the three-dimensional model that are in contact.

19. The method of claim 15, wherein the surface representation is converted into a digitised three-dimensional image data by sampling the surface representation at a resolution corresponding to that used in training data for the inference model.

20. A computer program product comprising a computer-readable storage medium having software instructions stored thereon, the software instructions being executable by a computer to perform the method of claim 15.

* * * * *